United States Patent [19]

Kobayashi

[11] 4,255,943
[45] Mar. 17, 1981

[54] HOLDING STRUCTURE FOR A DRIVE SHAFT IN A VEHICLE OF REAR WHEEL INDEPENDENT SUSPENSION TYPE

[75] Inventor: Katsuyuki Kobayashi, Toyota, Japan

[73] Assignee: Toyota Jidosha Kogyo Kabushiki Kaisha, Toyota, Japan

[21] Appl. No.: 58,774

[22] Filed: Jul. 19, 1979

Related U.S. Application Data

[63] Continuation of Ser. No. 860,305, Dec. 14, 1977, abandoned.

[30] Foreign Application Priority Data

Dec. 14, 1976 [JP]  Japan ................................ 51-168736

[51] Int. Cl.³ ............................................. F16D 3/34
[52] U.S. Cl. .......................................... 64/21; 64/22; 180/257
[58] Field of Search ..................... 64/21, 22; 180/254, 180/255, 256, 257, 258

[56] References Cited

U.S. PATENT DOCUMENTS

| | | | |
|---|---|---|---|
| 2,838,919 | 6/1958 | Cull | 64/21 |
| 3,083,782 | 4/1963 | Ivaldi | 180/254 |
| 3,464,232 | 9/1969 | Hutchinson | 64/21 |
| 3,490,251 | 1/1970 | Roethlisberger | 64/8 |
| 3,714,797 | 2/1973 | Fisher | 64/21 |
| 3,789,624 | 2/1974 | Camosso | 64/21 |
| 4,068,499 | 1/1978 | Sharp | 64/21 |

FOREIGN PATENT DOCUMENTS 2717029  10/1978  Fed. Rep. of Germany ............. 64/21

Primary Examiner—Ira S. Lazarus
Attorney, Agent, or Firm—Stevens, Davis, Miller & Mosher

[57] ABSTRACT

A holding structure for a drive shaft used in a vehicle of rear wheel independent suspension type to transmit power from a differential gear to a wheel. The structure comprises a constant velocity universal joint of fixed type provided in one end of the drive shaft near the differential gear and another constant velocity universal joint of slidable type provided in the other end of the drive shaft near the wheel to prevent longitudinal movement of the drive shaft.

2 Claims, 2 Drawing Figures

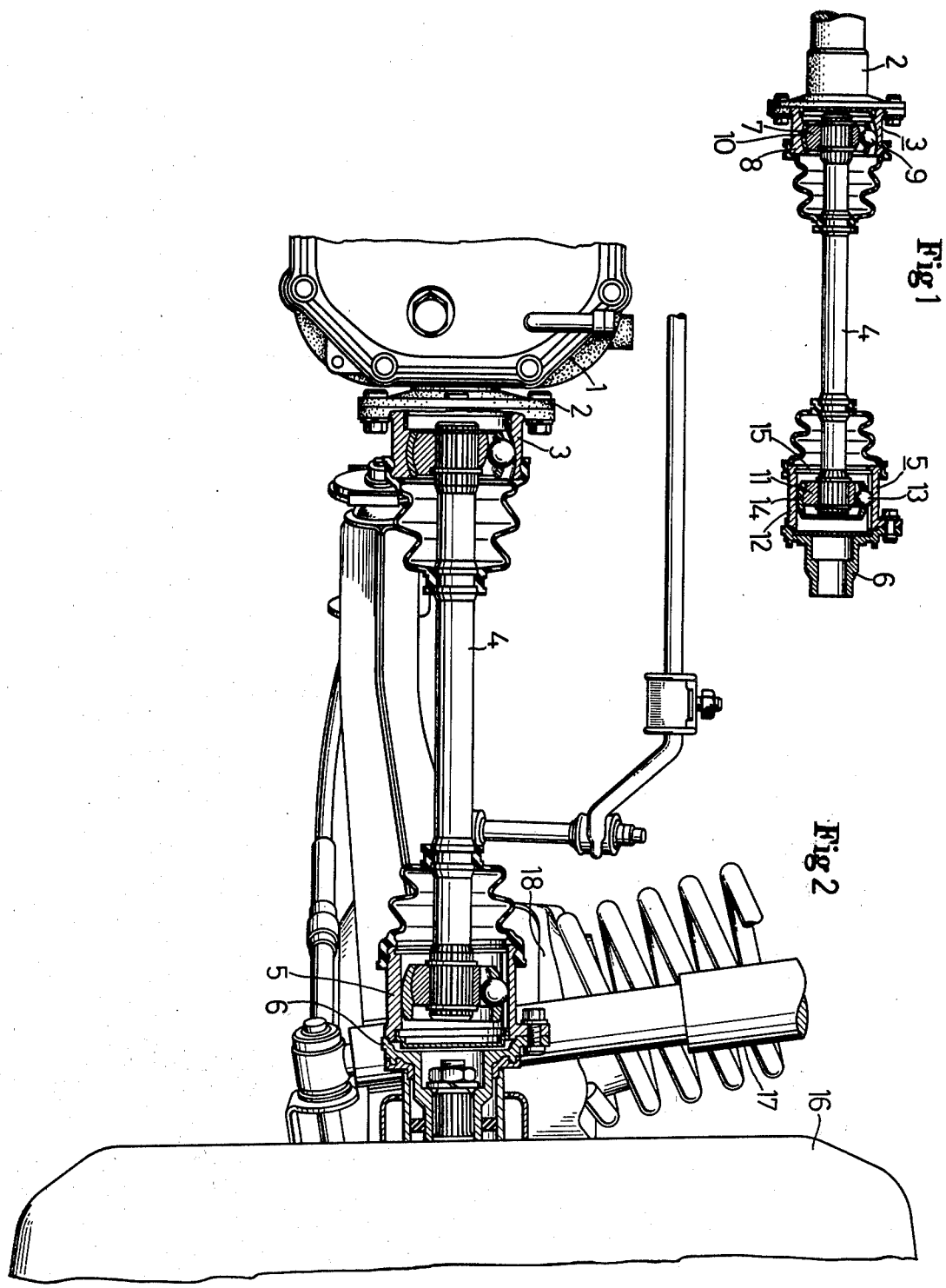

HOLDING STRUCTURE FOR A DRIVE SHAFT IN A VEHICLE OF REAR WHEEL INDEPENDENT SUSPENSION TYPE

This is a continuation of application Ser. No. 860,305 filed Dec. 14, 1977, now abandoned.

The present invention relates to a holding structure for a drive shaft used in a vehicle of the rear wheel independent suspension type to transmit power from a differential gear to a wheel.

In a conventional vehicle of the front engine from drive type, there is provided a transmission gear for transmitting torque from a differential gear to the wheel. The transmission gear comprises a drive shaft and a pair of constant velocity universal joints provided in the opposite ends of the drive shaft. In general, a Birfield ball-joint of fixed type is provided near the wheel and a double offset Birfield ball-joint of slidable type is provided near the differential gear to effectively utilize the allowable joint angle since the joint angle with the wheel is larger than that with the differential gear.

However, in a vehicle of the front engine rear drive type, there is no need of a large joint angle with a universal joint near the wheel for connecting a differential gear and the wheel with a pair of constant velocity universal joints. In a holding structure of the present invention, therefore, a fixed joint such as a Birfield ball-joint is used near the differential gear and a slidable joint such as a double offset Birfield ball-joint is used near the wheel in contrast with the conventional vehicle of the front engine front drive type.

It is an object of the present invention to provide a holding structure for a drive shaft in a vehicle of the rear wheel independent suspension type in which the drive shaft provided between a differential gear and the rear wheel will no move in the longitudinal direction upon movement of the rear wheel in the vertical direction to prevent the occurrence of noise when the vehicle is driven.

It is another object of the present invention to provide a holding structure for a drive shaft in a vehicle of the rear wheel independent suspension type in which constant velocity universal joints used in the opposite ends of the drive shaft are effectively cooled while the vehicle is driven to prevent their overheating and further increase their durability.

The invention will now be described in further detail by way of example with reference to the accompanying drawings, in which:

FIG. 1 is a longitudinal sectional view of a holding structure of the present invention; and FIG. 2 is a partially enlarged longitudinal sectional view of a rear wheel independent suspension system of a vehicle in which the holding structure of FIG. 1 is applied.

Referring now to the drawings, a differential gear 1 of a vehicle has a side gear shaft 2 which is connected through a Birfield ball-joint 3 of fixed type with one end of a drive shaft 4 which is, in turn, connected at the other end to a driven shaft 6 of a wheel 16 through a double offset Birfield ball-joint 5 of slidable type. Both of the Birfield ball-joint 3 and the double offset Birfield ball-joint 5 are well known in the art as a constant velocity joint. The Birfield ball-joint 3 comprises inner and outer rings 7 and 8, a plurality of balls 9 and a ring-shaped cage 10 having spherical inner and outer peripheries for holding the balls 9. The inner and outer rings 7 and 8 and the cage 10 are relatively rotatable on an identical axis. The inner ring 7 has a spherical outer periphery which is in surface contact with the inner periphery of the cage 10, and the outer ring 8 has a spherical inner periphery which is in surface contact with the outer periphery of the cage 10.

The balls 9 are in contact with regularly spaced annular grooves provided in the outer periphery of the inner ring 7 and in the inner periphery of the outer ring 8 respectively along the axis of the drive shaft 4, and are held at the middle portions thereof in holes provided in the cage 10. The annular grooves provided in the inner and outer rings 7 and 8 are oppositely inclined against a symmetry axis which is perpendicular to the central axis of the cage 10.

When the drive shaft 4 becomes inclined at an angle to the side gear shaft 2 and the drive shaft 4, the balls 9 are guided by the annular grooves in the inner and outer rings 7 and 8 to be always positioned on the plane which bisects the angle between the shafts 2 and 4.

The double offset Birfield ball-joint 5 comprises an inner ring 11 having a spherical outer periphery, an outer ring 12 having flat inner an outer peripheries, a plurality of balls 13, a ring-shaped cage 14 having spherical inner and outer peripheries for holding the balls 13 and a snap ring 15 provided in the inner end of the outer ring 12 to retain the inner ring 11. The outer and inner surfaces of the cage 14 are respectively in contact with the inner periphery of the outer ring 12 and the outer periphery of the inner ring 11 to support the inner ring 11 in the interior of the outer ring 12. The balls 13 are held in a plurality of regularly spaced holes in the cage 14 and are in contact with annular grooves provided in the inner and outer rings 11 and 12 in the axial direction to transmit torque between the inner and outer rings 11 and 12. The centers of the spheres defining the inner and outer peripheries of the cage 14 deviate with each other against the surface having the holes oppositely in the axial direction. Therefore, even when the inner ring 11 being in spline engagement with the drive shaft 4 becomes inclined relative to the outer ring 12 mounted to the driven shaft 6, the cage 14 is positioned on the plane which bisects the angle of inclination between the shafts 4 and 6. Thus, the torque of the drive shaft 4 is transmitted through the inner ring 11, the balls 13 and the outer ring 12 to the driven shaft 6 at the identical velocity with the drive shaft 4. When the double offset Birfield ball-joint 5, the drive shaft 4 and the driven shaft 6 are assembled with each other or the driven shaft 6 rotates at an angle against the drive shaft 4, the inner ring 11, the cage 14 and the balls 13 move integrally with the drive shaft 4 in the axial direction of the outer ring 12 or the outer ring 12 moves integrally with the driven shaft 6 in the axial direction of the drive shaft 4 by virtue of slide contact between the outer periphery of the cage 14 and the inner periphery of the outer ring 12 and rolling contact between the balls 13 and the grooves of the outer ring 12 to optionally adjust the relative displacement between the inner and outer rings 11 and 12.

In FIG. 2, numeral 17 shows a shock absorber and numeral 18 shows a coil spring seat.

In operation, the wheel 16 is driven by torque transmitted from the side gear shaft 2 through the Birfield ball-joint 3, the drive shaft 4, double offset Birfield ball-joint 5 and the driven shaft 6. When the wheel 16 and the driven shaft 6 are moved vertically by road irregularities or the condition of the vehicle, the drive shaft 4 and the double offset Birfield ball-joint 5 also move in a verticals swing along th Birfield ball-joint 3 mounted to the side gear shaft 2 of the differential gear 1 which is fixed to the vehicle body. Inclination thus formed between the side gear shaft 2 and the driven shaft 6 is absorbed by relative inclination of the inner and outer rings 7, 11, 8 and 12 and the cages 10 and 14 of the Birfield ball-joint 3 and the double offset Birfield ball-joint 5 provided in the opposite ends of the drive shaft 4. Similarly, changes in the distance between the Birfield ball-joint 3 and the double offset Birfield ball-joint 5 by swing movement of the drive shaft 4 are absorbed by sliding movement of the inner ring 11 and the cage 14 of the double offset Birfield ball-joint 5 against the outer ring 12 thereof.

When the vehicle is driven, the double offset Birfield ball-joint 5 is heated by sliding movement of the cage 14 and rolling movement of the balls 13 against the outer ring 12, however, since the double offset Birfield ball-joint 5 is provided near the wheel 16, it is sufficiently cooled by wind and has increased durability. Further, the Birfield ball-joint 3 provided near the differential gear 1 is fixed to the side gear shaft 2, i.e., the inner ring 7 thereof is immovable against the outer ring 8 to prevent the occurrence of noise and thereby the durability of the Birfield ball-joint 3.

While the invention has been described with reference to a preferred embodiment thereof, it is to be understood that modifications or variations may be easily made without departing from the scope of this invention which is defined by the appended claims.

What is claimed is:

1. A holding structure for a drive shaft used in a rear-wheel drive vehicle of the rear wheel independent suspension type to transmit power from a differential gear to a driven rear wheel, said structure comprising:
   a first constant velocity universal joint of fixed type on one end of said drive shaft adjacent said differential gear and remote from said wheel, said first constant velocity universal joint comprising:
   an outer ring having a spherical inner periphery;
   an inner ring having a spherical outer periphery, said inner ring being within the outer ring;
   a plurality of first balls;
   a ring-shaped cage for holding the first balls between the inner and outer rings, said cage being between the inner and outer rings and having spherical inner and outer peripheries;
   the spherical outer periphery of the inner ring is in surface contact with the inner periphery of the cage; and
   the spherical inner periphery of the outer ring is in surface contact with the outer periphery of the cage; and
   a second constant velocity universal joint of slidable type on he other end of said drive shaft adjacent said wheel and remote from said differential gear, said second velocity universal joint comprising:
   a second outer ring having a flat inner periphery;
   a second inner ring having a spherical outer periphery, said second inner ring being within the second outer ring;
   a plurality of second balls;
   a second ring-shaped cage for holding the second balls, said cage having spherical inner and outer peripheries, said second cage being between the second inner and outer rings;
   means for retaining the second inner ring within the second outer ring; and
   the outer and inner peripheries of the second cage are respectively in contact with the inner periphery of the second outer ring and the outer periphery of the second inner ring to support the second inner ring in the interior of the second inner ring.

2. A holding structure for a drive shaft used in a rear-wheel drive vehicle of the rear wheel independent suspension type to transmit power from a differential gear to a rear wheel driven by a driven shaft, said structure comprising:
   a first constant velocity universal joint of fixed type having an outer ring connected at its differential side to a side gear shaft by a bolt; and
   a second constant velocity universal joint of slidable type having an outer ring connected to said driven shaft of said wheel by a bolt.

* * * * *